United States Patent [19]

Burnside

[11] 4,223,479
[45] Sep. 23, 1980

[54] FEEDBACK CONTROLLED ROLLER APPLICATOR

[75] Inventor: Orvin C. Burnside, Lincoln, Nebr.

[73] Assignee: The Board of Regents of the University of Nebraska, Lincoln, Nebr.

[21] Appl. No.: 56,334

[22] Filed: Jul. 10, 1979

[51] Int. Cl.³ ............................................. B05C 1/00
[52] U.S. Cl. ...................................... 47/1.5; 101/363; 101/DIG. 24
[58] Field of Search ................................ 47/1.5, 1.43; 101/DIG. 24; 324/65 R

[56] References Cited

U.S. PATENT DOCUMENTS

| | | | |
|---|---|---|---|
| 3,232,006 | 2/1966 | Atherton et al. | 47/1.5 |
| 3,730,086 | 5/1973 | Dauterman | 101/DIG. 24 |
| 3,884,076 | 5/1975 | Studer | 101/DIG. 24 |
| 4,019,278 | 4/1977 | McKirdy | 47/1.5 |

FOREIGN PATENT DOCUMENTS

| | | | |
|---|---|---|---|
| 2322538 | 4/1977 | France | 47/1.5 |
| 2342655 | 9/1977 | France | 47/1.5 |
| 2004724 | 11/1979 | United Kingdom | 47/1.5 |

OTHER PUBLICATIONS

Liquid Level Detector, Carmichael et al., IBM Tech. Disc. Bull., vol. 16, No. 3, Aug. 1973, p. 775.

Primary Examiner—Robert E. Bagwill
Attorney, Agent, or Firm—Vincent L. Carney

[57] ABSTRACT

To apply herbicide to weeds extending above a crop, a nylon carpet on the cylinder of a roller applicator has herbicide applied to it as a tractor or other vehicle carries it through a field. The roller is held just above the crop where it contacts weeds and is rotated in the opposite direction as the tractor. A moisture sensor is spaced from the applicator on the roller and controls a valve that applies the herbicide to the roller to maintain a preset moisture level in the roller carpet. The amount of moisture is set by experimentation to permit an adequate amount of herbicide to be applied to various weeds without causing dripping from the point of contact on the roller by the weeds.

29 Claims, 4 Drawing Figures

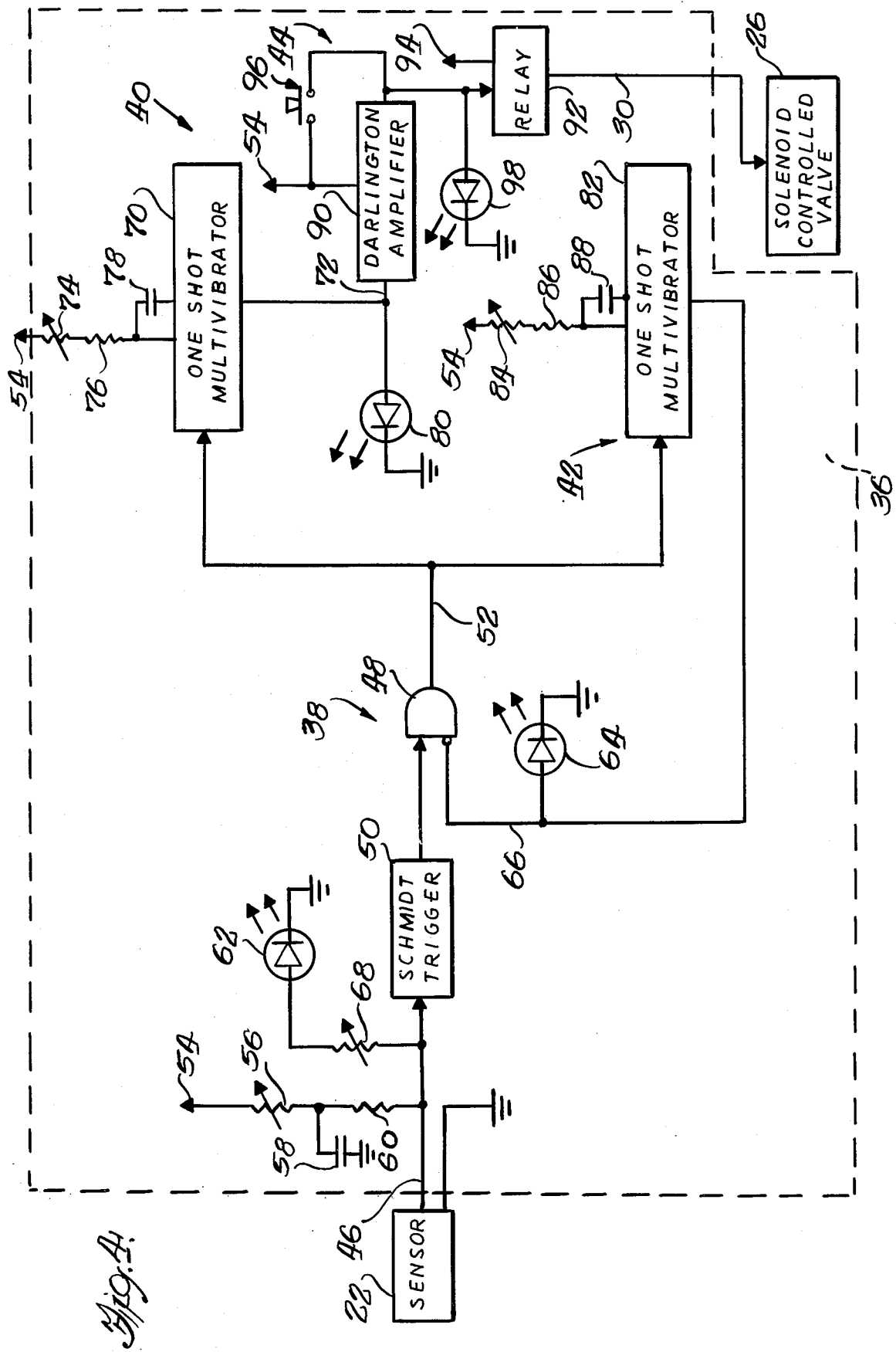

FEEDBACK CONTROLLED ROLLER APPLICATOR

This invention relates to roller applicators of the type used to apply liquids to weeds extending above a crop.

Roller applicators are known in which a roller is carried by a vehicle through fields and is rotated at a height where it contacts plants to be killed. For example, the roller is carried through croplands and rotated above the crop at a height at which it contacts the weed escapes but not the crop. The roller has a herbicide on its surface to selectively apply the herbicide to the weeds that it contacts.

The prior art roller applicators have a disadvantage in that they use an excessive amount of herbicide beyond the amount that is necessary. It has also been discovered that the weeds, when they press against the roller, cause some herbicide to drip and thus damage the crop. Weeds emerging from beneath the roller may also spring up and flip the herbicide on the crop.

Accordingly, it is an object of the invention to provide a novel roller applicator.

It is a further object of the invention to provide a novel method for controlling weeds with a roller applicator.

It is a still further object of the invention to provide a roller applicator which conserves herbicide and reduces damage to crops.

It is a still further object of the invention to provide a method and apparatus for controlling the moisture in the roller covering on a roller applicator.

In accordance with the above and further objects of the invention, a roller applicator includes a roller mounted to a vehicle to be positioned at an elevation where it may contact weeds above a crop and a feedback-controlled moistener for the roller. The feedback-controlled moistener includes: (1) means for applying herbicide to the roller such as a perforated pipe or the like; (2) a control valve for controlling the time and the amount of herbicide to be applied through the applicator; and (3) a sensor on the roller spaced a distance away from the applicator to sense the moisture at that location periodically and control the valve to maintain the proper moisture.

As can be understood from the above description, the roller applicator of this invention has several advantages, such as: (1) it is economical of the herbicide and does not use more than necessary; and (2) it reduces herbicide damage to crops.

The above noted and other features of the invention will be better understood from the following detailed description when considered with reference to the accompanying drawings in which:

FIG. 4 is a block diagram illustrating a portion of the embodiment of FIG. 1.

Figure 1:
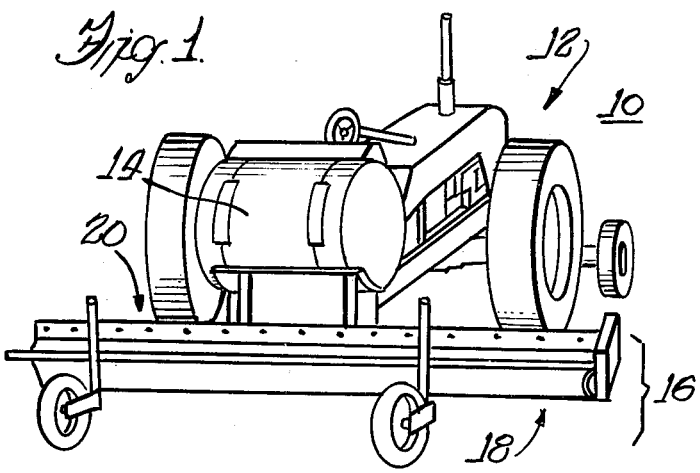
FIG. 1 is a perspective view of a roller applicator in accordance with an embodiment of the invention.

In FIG. 1, there is shown a tractor-mounted roller applicator 10 including a tractor 12, a tank 14, and a roller applicator 16. The roller applicator 16 includes a nylon covered cylinder 18 and a feedback-controller roller moistener 20.

The tank 14 and the roller applicator 16 are mounted to and carried by tractor 12 for application of herbicide or the like to plant life in the path of the tractor 12. In the preferred embodiment, the tractor 12 is a type having a hydraulic lift in its rear portion which carries the roller applicator 16 or it may be of the high clearance type sold under the trademark Hahn Hi-Boy 312. The tank 14 is mounted to the rear of it and contains a herbicide for moistening the roller applicator 16 as needed. The roller applicator 16 may be raised or lowered by the hydraulic lift.

To apply herbicide to plants or the like, the herbicide is applied to the roller 18 by the feedbackcontrolled roller moistener 20 and the roller is rotated as the tractor moves over the crop with the hydraulic lift holding the roller at the proper height to apply the herbicide to weeds at that height. For this purpose, the roller in the preferred embodiment is a 30 centimeter diameter cylinder 4.6 meters long covered with a nylon carpet.

The feedback-controlled roller moistener 20 includes a perforated pipe which applies the herbicide to the roller and a belt which distributes the herbicide over the roller. A feedback mechanism senses the amount of moisture on the roller a predetermined distance from the place where it is applied and opens or closes a valve to control the flow through the perforated pipe and thus maintain a predetermined moisture. The roller 18 is rotated in the preferred embodiment at approximately 32 r.p.m. in a direction opposite to the direction of travel of the tractor 12.

Before operating the tractor-mounted roller applicator 10 to apply herbicide or other fluid to plants, the fluid is applied to the nylon cover of the roller 18. The roller is moistened so that it applies the fluid to plants that press against it but does not drip fluid from the nylon adjacent to that point.

This is accomplished by permitting the fluid to flow through a perforated pipe against the roller 18 from the feedback-controller moistener 20. A rubber belt is pressed against the roller as it rotates to distribute the moisture. The amount of moisture is controlled by a feedback system which includes a moisture sensor spaced some distance from the perforated pipe which senses the moisture and opens and shuts the solenoid controlled valve in accordance with the measurement of moisture. The roller applicator 16 is adjusted to the height desired. This height is sufficient so it does not contact the crop but low enough to contact weeds that protrude above the crop plants.

After adjusting, the tractor moves through the crop with the roller 18 rotating in the opposite direction of movement from the tractor at approximately 32 r.p.m. Weeds which extend above the crop press against the roller and receive herbicide or whatever fluid is being applied, primarily to their underside. There is very little dripping from the roller onto plants adjacent to the weed so that unintentional application of the fluid is avoided.

While a specific type of vehicle has been described, this specific type of vehicle is not part of the invention and any means for carrying the roller at the proper height and rotating it or permitting it to rotate as it moves across the field is suitable. Similarly, other techniques for applying the moisture to the nylon roller may be used instead of the perforated pipe and rubber belt and there is no specific requirement as to the type of moisture feedback control since many such moisture sensor are commercially available and may be adjusted to perform the desired function.

For proper operation, the moisture sensor should be spaced from the point at which the fluid is applied to the roller to permit the liquid to stabilize before it reaches the detector. The location of the detector is not critical but it must be spaced from the applicator and preferably be located against the roller at a location where it will not be hit by the weeds. In the preferred embodiment, the sensor is located at the top-front of the roller, the front being a side in the direction of motion of the vehicle.

Figure 2:
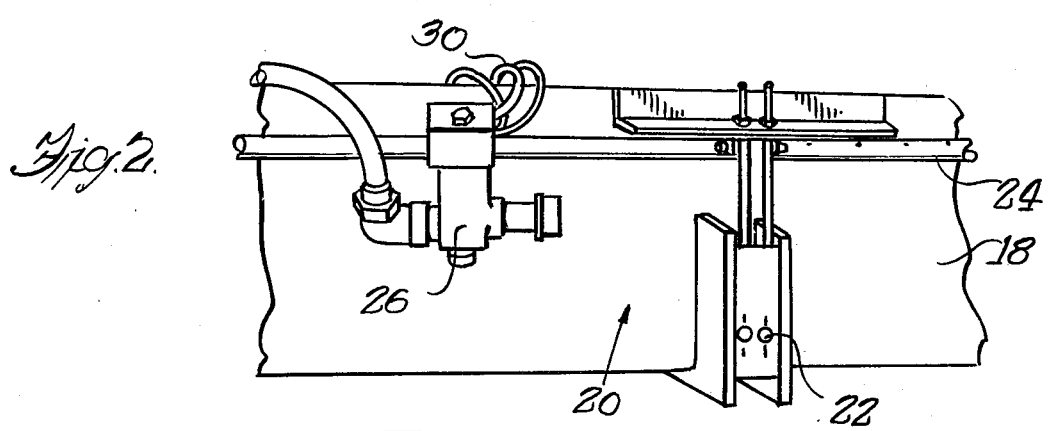
FIG. 2 is a fragmentary enlarged view of a portion of the embodiment of FIG. 1.

In FIG. 2, there is shown a fragmentary enlarged view of the feedback-controlled roller moistener 20 and the roller 18, with the feedback-controlled roller moistener being shown as it operates in cooperation with the roller 18 to maintain a predetermined amount of fluid within the nylon cover of the roller 18. For this purpose, the feedback-controlled roller moistener 20 includes a moisture sensor 22, an applicator which is a perforated pipe 24 and a solenoid controlled valve 26.

The perforated pipe 24 receives fluid from a connecting pipe connecting the solenoid operated valve 26 and the perforated pipe 24 to the hose 28 which is connected through a pressure regulator and pump to the tank 14 (FIG. 1). The valve 26 is connected by electrical conductors 30 through a control panel to the sensor 22 which senses moisture.

In operationa, the fluid applied to the roller 18 by the pipe 24 is smoothed by a belt (not shown in FIG. 2) and rotated by the roller 18 so that it eventually reaches the sensor 22. The sensor 22, after a predetermined time from the application of the fluid to the roller, senses the amount of moisture and, if it is below a predetermined amount as controlled by a panel, sends a signal to the solenoid controlled valve 26 which applies more fluid to the pipe 24. If the moisture iw within the desired range, the valve 26 remains closed so no new herbicide is applied to the roller 18.

The solenoid controlled valve 26 is positioned close to the pipe 24 to provide greater control over the fluid by reducing the amount of full conduit between it and the pipe 24.

Figure 3:
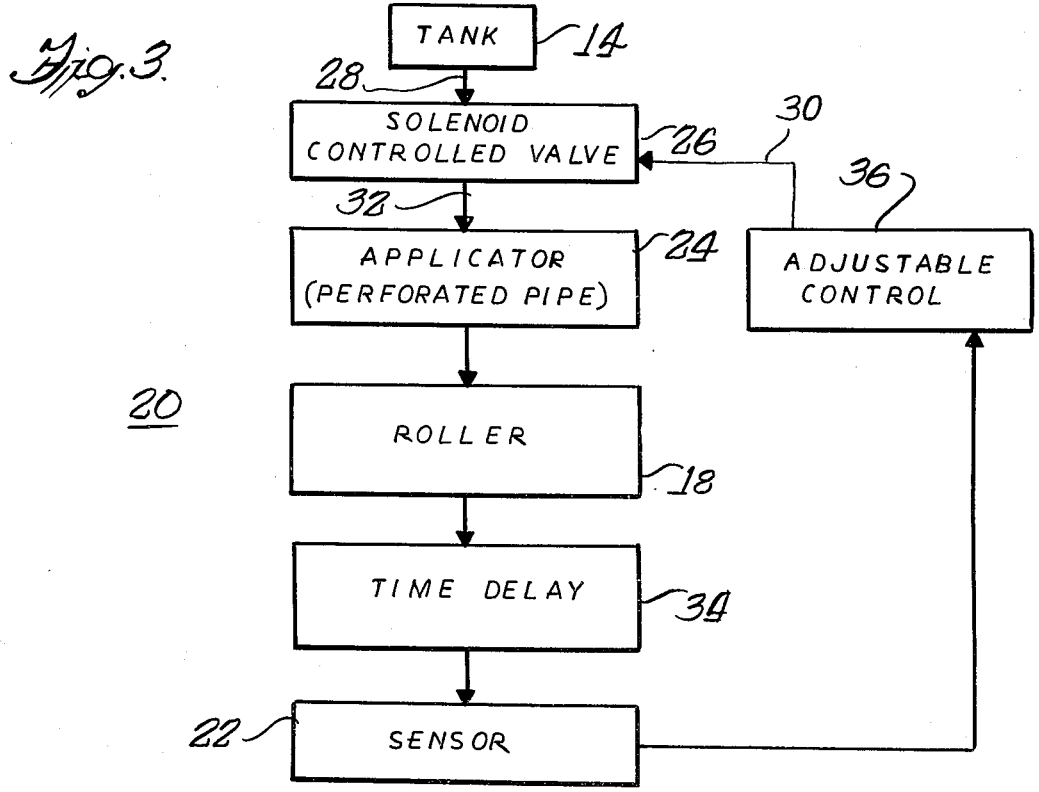
FIG. 3 is a block diagram illustrating the embodiment of FIG. 1.

In FIG. 3, there is shown a block diagram of the feedback-controlled roller moistener 20 illustrating the flow of fluid from the tank 14, through the following series of components in the order named, which are: (1) the hose 28; (2) the solenoid controlled valve 26; (3) a hose section 32; (4) the pipe 24; (59 the roller 18; and (6) after a time delay represented by the block 34, to the sensor 22. The time delay 34 is at least partly provided by the distance through which the roller must rotate before reaching the sensor which is determined by the mounting means for spacing the sensor 22 from the pipe 24. However, some delay may also be provided by circuitry that controls the sensing time after the solenoid valve is closed.

To control the solenoid controlled valve 26, an adjustable control 36 is mounted to the tractor and electrically connected to the sensor 22 and to the solenoid controlled valve 26. This adjustable control permits an adjustment such as by a potentiometer or the like which controls the sensitivity of the sensor 22 so that, when the moisture falls below an adjustable amount as set on the adjustable control 36, the solenoid controlled valve 26 is operated to permit more fluid to flow into the pipe 24 for application to the roller (FIG. 1 and 2).

While the block diagram shown in FIG. 3 is for an automated system of a type described hereinafter, manual controls may also be used. For example, the moisture sensor 22 may be a type which has a meter. Under such a circumstance, an operator looking at the meter on the moisture sensor 22 adjusts the adjustable control 36 each time the meter indicates that the moisture has fallen below a predetermined amount. In the alternative, a moisture meter may have the meter galvanometer bypassed or connected in parallel so that the electrical current which operates the meter automatically triggers the solenoid at a preset voltage. A suitable metered moisture sensor is sold under the trade name Delmhorst Soil Moisture Meter.

In FIG. 4, there is shown a block diagram of the sensor 22, the adjustable control 36 and the solenoid controlled valve 26. The specific block diagram is not part of the claimed invention but was developed by employees of the United States Department of Agriculture under the supervision of J. S. Schepers at the request of the inventor to implement his invention covered by the claims herein.

The adjustable control 36 includes a Schmidt trigger circuit 38, a moistening-cycle-duration control circuit 40, a time-between-cycles control circuit 42, and a solenoid valve control circuit 44. The sensor 22 includes electrodes, one of which is grounded and the other of which is electrically connected to the Schmidt trigger circuit 38 which applies pulses to the moistening-cycle-duration control circuit 40 and to the time-between-cycles control circuit 42, with the output of the time duration circuit controlling the solenoid valve circuit 44 which applies a signal through conductor 30 to the solenoid controlled valve 26 to cause application of moisture to the roller 18 (FIGS. 1, 2, and 3).

In one embodiment, the sensor 22 includes two copper electrodes mounted on a plexiglass carrier mechanism which conforms to the curvature of the roller 18 (FIG. 2). Each electrode is approximately one centimeter wide and has an effective contact length of 15 centimeters. The electrodes are rigidly positioned parallel to each other with an inter-electrode spacing of approximately 4.5 centimeters. The electrode pair is allowed to float against the carpet of the roller 18, being biased against the carpet by a spring loaded connecting rod between the frame supporting the roller and the carrier mechanism.

The resistance between the electrodes varies depending on the moisture on the roller. Thus, the two electrodes from a variable resistance path between a conductor 46 and ground. With these electrodes, resistances below 1 K (kilohm) contain an insufficient amount of herbicide and 5 K contain too much herbicide in which the herbicide was a 1% to 5% solution of glyphosate. Of course, other resistances are appropriate for other herbicides and for other roller-and-electrode combinations. Thus, the proper settings are determined experimentally for each roller and herbicide combination.

To provide a signal when the moisture on the roller falls to too low a value, a Schmidt trigger circuit 38 includes a gate 48 and a Schmidt trigger 50. Conductor 46 is electrically connected to the Schmidt trigger 50, the output of which is electrically connected to one input of the AND gate 48. The other input is connected through an inverter to the time-between-cycles control circuit 42 so that the AND gate 48 is enabled when a signal is applied to conductor 46 indicating that the roller is drier than desired. In the preferred embodiment, the amplitude of this signal is approximately 1.7 volts or greater.

When a signal is transmitted from the time-between-cycles control circuit 42 to the input of AND gate 48 indicating that the time delay between cycles has elapsed and a signal is received from Schmidt trigger 50 indicating a too dry condition, the output of the AND gate 48 is electrically connected to conductor 52. This output pulse is applied through conductor 52 to the moistening-cycle-duration control circuit 40 and to the time-between-cycles control circuit 42 in parallel.

To adjust the voltage level, and thus the amount of moisture on the roller, below which a moistening cycle will be triggered, the Schmidt trigger circuit 38 includes a regulated 5-volt source of potential 54, connected to one end of an adjustable potentiometer 56, which may be manually controlled from the front of a panel by the control operator. The other end of the potentiometer 56 is connected to ground through a capacitor 58 and to conductor 46 through a resistor 60.

The adjustment of the potentiometer 56 controls the potential on conductor 46 and thus the signal level at the input of AND gate 48 connected to conductor 46 for any predetermined moisture. Thus the potentiometer 56 may be adjusted until the roller applies herbicide to the weed escapes without dripping the herbicide in the vicinity of the crop The setting may be determined experimentally. In the preferred embodiment, potentiometer 56 is a 10 K potentiometer, resistor 60 is 1 K and capacitor 58 is approximately one-tenth of a microfarad to short alternating current noise to ground.

To indicate when a cycle has been initiated and the time between cycles, the Schmidt trigger circuit 38 includes first and second light emitting diodes 62 and 64, with the diode 62 having its anode electrically connected to conductor 46 through a potentiometer 68 and its cathode grounded and the diode 64 having its anode electrically connected to conductor 66 at the inverting input of the AND gate 48 and its cathode grounded.

With these connections, the LED 62 is illuminated whenever the potential on conductor 46 indicates that the roller is dry enough to initiate a wetting cycle after the time duration has elapsed and the light emitting diode 64 indicates that the circuit is on hold until the time between sensing cycles elapses. Thus, when a wetting cycle is initiated, the diode 64 is not illuminated and diode 62 is illuminated. The illumination level of diode 62 is set by a potentiometer 68 in series between its anode and conductor 46.

To adjust the time that fluid is applied to the roller 18 (FIGS. 1-3) from the pipe 24, the time-duration control circuit 40 includes a one shot multivibrator 70, having its input electrically connected to conductor 52 and its output connected to the solenoid valve control circuit 44 through a conductor 72. To adjust the time constant of the one shot multivibrator 70, the regulated 5-volt source of potential 54 is electrically connected to the one shot multivibrator 70 through a potentiometer 74 and a resistor 76 in series, with a capacitor 78 having one plate electrically connected to one end of the resistor 76 and its other plate electrically connected to the cross over circuit of the one shot multivibrator 70.

With this time constant control circuit, the potentiometer 74 is adjusted so as to apply an appropriate amount of herbicide through the pipe to the roller each time the roller becomes too dry. This amount can be set experimentally and is a function of the particular pipe, the particular fluid and the amount of pressure applied to the fluid. Thus, a pipe applicator with a large number of large apertures requires a shorter time duration than a pipe applicator with relatively small apertures or apertures few in number and the same pressure behind the fluid. To indicate when the signal for applying fluid is present, an LED diode 80 has its anode electrically connected to conductor 72 and its cathode grounded.

To adjust the time between sensing cycles, the time-between-cycles control 42 includes a one shot multivibrator 82 having its input electrically connected to conductor 52 and its output electrically connected to conductor 66. The time constant of the one shot multivibrator 82 is controlled by an adjustable potentiometer 84 having one end electrically connected to the regulated source of 5-volts potential 54 and its other end connected through a resistor 86 to the cross over circuit of the one shot multivibrator 82. A capacitor 88 is also electrically connected to the resistor 86 and to the cross over circuit.

With this arrangement, the potentiometer 84 may be adjusted to control the time between cycles. This time is set to be sure the roller 20 continues to have sufficient moisture on it while reducing the number of unnecessary cycles of liquid. The potentiometers 74 and 84 are adjusted together experimentally to a satisfactory value.

To control the solenoid valve 26, the solenoid valve control circuit 44 includes a Darlington amplifier 90 and a relay 92. The input of the Darlington amplifier 90 is electrically connected to the conductor 72 and its output connected to the coils of the relay 92 to cause them to close when the one shot multivibrator 70 is applying a pulse.

The contacts of the relay 92 connect a 12-volt source of potential 94 such as from the battery to conductor 30 when closed. The potential on conductor 30 is applied to the windings of a solenoid controlled valve 26.

To permit the roller to obtain moisture when the sensor does not indicate dryness or between cycles, a manual override pushbutton switch 96 has one of its stationary contacts electrically connected to the regulated 5-volt power supply 54 and its other stationary contact electrically connected to the relay 92. With these connections, the armature, when depressed by the operator, connects the source of potential 54 directly to the relay 92 to operate it, causing a 12-volt potential from battery 94 to be applied to the solenoid controlled valve 26 through conductor 30.

To indicate that moisture is being applied, a light emitting diode 98 has its anode electrically connected to the output of the Darlington amplifier 90 and one contact of the manual override switch 96 and has its cathode grounded to be illuminated when the override switch 96 is depressed or the one shot multivibrator 70 is signaling a moisture cycle.

The regulated 5-volt supply 54 may be provided by any regulated power supply from any convenient source such as the 12-volt battery commonly found on vehicles. Of course, any other convenient source of power may be used. Similarly, many of the values and particular circuit units in the embodiment illustrated in FIG. 4 may be changed or substituted in a manner known to those in the art. The specific circuit shown in FIG. 4 is not part of the invention and is shown only as being illustrative of one way of implementing the invention.

It has been found in operation that with a one-half inch perforated pipe having perforations spaced apart two inches and having diameters of approximately one thirty-second of an inch diameter, operating pressure from a positive liquid displacement pump with pressure regulator 20 to 30 psi with a two second rotation time for the roller. The pressure is adjusted experimentally. Of course, faster or slower speeds of turning of the roller may be used. The time duration between cycles as adjusted by the potentiometer 84 may be several minutes for a moderate speed of the tractor through the field to maintain the herbicide within the desired range. A filter is incorporated to filter the herbicide and avoid clogging of the equipment.

From the above description, it may be understood that the roller applicator of this invention has the advantages of: (1) providing economy in the use of herbicide by controlling the amount supplied to plants; and (2) increasing crop yields by reducing damage from dripping of the herbicide.

Although a preferred embodiment of the invention has been described in some detail, many modifications and variations are possible in the preferred embodiment without deviating from the invention. It is therefore to be understood that, within the scope of the appended claims, the invention may be practiced other than as specifically described.

What is claimed is:

1. A method of selectively applying fluids to plants, comprising the steps of:
   adjusting a member at a location above first plants and at an elevation lower than the tops of second plants;
   moistening said member with said fluid;
   moving said member above said first plants so that it contacts an upper portion of said second plants;
   moistening said member with said fluid to be applied to said second plants;
   controlling the amount of moisture on said member; and
   said step of controlling the amount of moisture including the step of measuring the moisture on said member and applying fluid to maintain said moisture within a predetermined range.

2. A method according to claim 1 in which the step of controlling the amount of moisture includes the step of controlling the moisture so that it is sufficient to apply fluid to plants it contacts but not enough to cause substantial dripping of fluid from said member when said plants are no longer in contact with said member from the spot the plants contacted the member.

3. A method according to claim 2 in which the step of controlling the amount of moisture further comprises the steps of:
   moistening said member;
   testing said member by pressing against it;
   adjusting the moisture to a set moisture so that when it is pressed against, fluid leaves the member and adheres to the pressing object and when the pressing object is released substantial dripping of fluid does not occur from said member; and
   maintaining said member with a moisture within a predetermined range of said set moisture.

4. A method according to claim 3 in which the step of controlling the amount of moisture includes the steps of:
   periodically measuring said moisture; and
   applying new moisture to said member when said moisture falls below a predetermined range.

5. A method according to claim 4 further including the steps of:
   rotating said member;
   applying said fluid to said member as it rotates;
   measuring the fluid on said member at a location spaced from the location on said rotating member to which said fluid is applied; and
   adjusting the amount of fluid applied to maintain said moisture content within a predetermined range.

6. A method according to claim 5 in which the step of adjusting includes the step of automatically adjusting by a feedback circuit.

7. A method according to claim 1 in which the step of controlling the amount of moisture includes the steps of:
   periodically measuring said mositure; and
   applying new moisture to said member when said moisture falls below a predetermined range.

8. A method according to claim 1 further including the steps of:
   rotating said member;
   applying said fluid to said member as it rotates;
   measuring the fluid on said member at a location spaced from the location on said rotating member to which said fluid is applied; and
   adjusting the amount of fluid applied to maintain said moisture content within a predetermined range.

9. A method according to claim 1 in which the step of adjusting includes the step of automatically adjusting by a feedback circuit.

10. Apparatus for applying fluids to plants comprising:
    applicator means for applying moisture to plants that come into contact with it;
    means for carrying said applicator means across a field at a preset elevation;
    means for sensing the moisture content of said applicator means;
    means for applying moisture to said applicator means; and
    said means for sensing the moisture on said applicator means being connected to said means for applying moisture to control said means for applying moisture whereby the moisture may be maintained within a predetermined range.

11. Apparatus according to claim 10 in which:
    said applicator means comprises a roller; and
    said means for applying including means for applying fluid to said roller as the roller rotates so as to spread said fluid across the surface from a fixed point.

12. Apparatus according to claim 11 in which said means for controlling includes a means for controlling the fluid flowing through said means for applying in accordance with the measurement from said sensing means.

13. Apparatus according to claim 11 in which said sensing means is spaced from said means for applying moisture.

14. Apparatus according to claim 11 in which said means for carrying comprises a vehicle having adjustable means for adjusting said roller to a predetermined elevation.

15. Apparatus according to claim 11 in which said means for applying moisture comprises a perforated pipe positioned against the surface of said applicator means.

16. Apparatus according to claim 12 in which said sensing means is spaced from said means for applying moisture.

17. Apparatus according to claim 16 in which said means for carrying comprises a vehicle having adjustable means for adjusting said roller to a predetermined elevation.

18. Apparatus according to claim 17 in which said means for applying moisture comprises a perforated pipe positioned against the surface of said applicator means.

19. Apparatus according to claim 18 in which said means for controlling includes an automatically operated valve communicating with said means for applying.

20. Apparatus according to claim 19 including means for opening said valve of said automatically operated valve when said moisture on said drum falls below a predetermined level.

21. Apparatus according to claim 13 in which said means for applying moisture comprises a perforated pipe positioned against the surface of said applicator means.

22. Apparatus according to claim 16 in which said means for controlling includes an automatically operated valve communicating with said means for applying.

23. Apparatus according to claim 12 in which said means for carrying comprises a vehicle having adjustable means for adjusting said roller to a predetermined elevation.

24. Apparatus according to claim 12 in which said means for applying moisture comprises a perforated pipe positioned against the surface of said applicator means.

25. Apparatus according to claim 10 in which said means for controlling includes a means for controlling the fluid flowing through said means for applying in accordance with the measurement from said sensing means.

26. Apparatus according to claim 10 in which said sensing means is spaced from said means for applying moisture.

27. Apparatus according to claim 10 in which said means for carrying comprises a vehicle having adjustable means for adjusting said roller to a predetermined elevation.

28. Apparatus according to claim 10 in which said means for applying moisture comprises a perforated pipe positioned against the surface of said applicator means.

29. Apparatus according to claim 10 in which said means for controlling includes an automatically operated valve communicating with said means for applying.

* * * * *

UNITED STATES PATENT AND TRADEMARK OFFICE
CERTIFICATE OF CORRECTION

PATENT NO. : 4,223,479
DATED : September 23, 1980
INVENTOR(S) : Orvin C. Burnside It is certified that error appears in the above-identified patent and that said Letters Patent are hereby corrected as shown below:

IN THE SPECIFICATION:

Column 2, line 13, change "feedbackcontrolled" to "feedback-controlled".

Column 3, line 1, change "sensor" to "sensors".

Column 3, line 29, change "operationa" to "operation".

Column 3, line 37, change "iw" to "is".

Column 3, line 50, change "(59" to "(5)".

Column 4, line 50, change "from" to "form".

Column 4, line 61, change the second occurrence of "a" to "the".

Column 5, line 28, after the word "crop", insert "." (period).

IN THE CLAIMS:

Claim 12, line 2, change the first occurrence of "controlling" to "applying".

UNITED STATES PATENT AND TRADEMARK OFFICE
CERTIFICATE OF CORRECTION

PATENT NO. : 4,223,479

DATED : September 23, 1980

INVENTOR(S) : Orvin C. Burnside

It is certified that error appears in the above—identified patent and that said Letters Patent is hereby corrected as shown below:

Claim 16 should be claim 20 and the dependency changed from "12" to "11".

Claim 17 should be claim 21 and the dependency changed from "16" to "10".

Claim 18 should be claim 24 and the dependency changed from "17" to "10".

Claim 19 should be claim 28 and the dependency changed from "18" to "10".

Claim 19, line 2, change "controlling" to "applying".

Claim 20 should be claim 17 and the dependency changed from "19" to "16".

Claim 21 should be claim 27.

Claim 22 should be claim 29 and the dependency changed from "16" to "13".

Signed and Sealed this

Nineteenth Day of May 1981

[SEAL]

Attest:

RENE D. TEGTMEYER

Attesting Officer

Acting Commissioner of Patents and Trademarks

UNITED STATES PATENT AND TRADEMARK OFFICE
CERTIFICATE OF CORRECTION

PATENT NO. : 4,223,479

DATED : September 23, 1980

INVENTOR(S) : Orvin C. Burnside

It is certified that error appears in the above—identified patent and that said Letters Patent is hereby corrected as shown below:

IN THE SPECIFICATION

Column 2, line 13, change "feedbackcontrolled" to --feedback-controlled--.

Column 3, line 1, change "sensor" to --sensors--.

Column 3, line 29, change "operationa" to --operation--.

Column 3, line 37, change "iw" to --is--.

Column 3, line 50, change "(59" to --(5)--.

Column 4, line 61, change the second occurence of "a" to --the--.

Column 5, line 28, after the word "crop", insert --.-- (period).

UNITED STATES PATENT AND TRADEMARK OFFICE
CERTIFICATE OF CORRECTION

PATENT NO. : 4,223,479

DATED : September 23, 1980

INVENTOR(S) : Orvin C. Burnside

It is certified that error appears in the above—identified patent and that said Letters Patent is hereby corrected as shown below:

Claim 12, line 1, change "12" to --20--.

Claim 12, line 2, change the first occurence of "controlling" to --applying--.

Claim 13, line 1, change "13" to --22--.

Claim 14, line 1, change "14" to --25--.

Claim 15, line 1, change "15" to --12--.

Claim 16, line 1, change "16" to --23-- and change the dependency from "12" to --20--.

Claim 17, line 1, change "17" to --26-- and change the dependency from "16" to --23--.

UNITED STATES PATENT AND TRADEMARK OFFICE
CERTIFICATE OF CORRECTION

PATENT NO. : 4,223,479
DATED : September 23, 1980
INVENTOR(S) : Orvin C. Burnside It is certified that error appears in the above—identified patent and that said Letters Patent is hereby corrected as shown below:

Claim 18, line 1, change "18" to --13-- and change the dependency from "17" to --23--.

Claim 19, line 1, change "19" to --27-- and change the dependency from "18" to --23--.

Claim 20, line 1, change "20" to --29-- and change the dependency from "19" to --15--.

Claim 21, line 1, change "21" to --14-- and change the dependency from "13" to --26--.

Claim 22, line 1, change "22" to --15-- and change the dependency from "16" to --14--.

Claim 23, line 1, change "23" to --16-- and change the dependency from "12" to --20--.

UNITED STATES PATENT AND TRADEMARK OFFICE
CERTIFICATE OF CORRECTION

PATENT NO. : 4,223,479
DATED : September 23, 1980
INVENTOR(S) : Orvin C. Burnside It is certified that error appears in the above—identified patent and that said Letters Patent is hereby corrected as shown below:

Claim 24, line 1, change "24" to --17-- and change the dependency from "12" to --20--.

Claim 25, line 1, change "25" to --18--.

Claim 25, line 2, change "controlling" (first occurence) to --applying--.

Claim 26, line 1, change "26" to --19--.

Claim 27, line 1, change "27" to --21--.

Claim 28, line 1, change "28" to --24--.

Claim 29, line 1, change "29" to --28--.

Claim 29, line 2, change "controlling" to --applying--.

Signed and Sealed this

Eighteenth Day of August 1981

[SEAL]

Attest:

GERALD J. MOSSINGHOFF

*Attesting Officer*     *Commissioner of Patents and Trademarks*